US011200530B2

(12) United States Patent
Salter et al.

(10) Patent No.: US 11,200,530 B2
(45) Date of Patent: Dec. 14, 2021

(54) OBJECT DETECTION

(71) Applicant: Ford Global Technologies, LLC, Dearborn, MI (US)

(72) Inventors: Stuart C. Salter, White Lake, MI (US); Kristin Ann Hellman, Walled Lake, MI (US); Pietro Buttolo, Dearborn Heights, MI (US); Annette Lynn Huebner, White Lake, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 250 days.

(21) Appl. No.: 15/681,847

(22) Filed: Aug. 21, 2017

(65) Prior Publication Data

US 2019/0057341 A1    Feb. 21, 2019

(51) Int. Cl.
*G06Q 10/08* (2012.01)
*G05D 1/02* (2020.01)
*G05D 1/00* (2006.01)

(52) U.S. Cl.
CPC .......... *G06Q 10/08* (2013.01); *G05D 1/0088* (2013.01); *G05D 1/0234* (2013.01); *G05D 1/0246* (2013.01); *G05D 2201/0213* (2013.01)

(58) Field of Classification Search
CPC ... G05D 1/0088; G05D 1/0234; G05D 1/0246

USPC .......................................................... 701/28
See application file for complete search history.

(56) References Cited

U.S. PATENT DOCUMENTS

| | | | |
|---|---|---|---|
| 9,256,852 B1 | 2/2016 | Myllymaki | |
| 9,398,795 B2 | 7/2016 | Gupta et al. | |
| 9,616,773 B2 | 4/2017 | Bradley et al. | |
| 2007/0018813 A1* | 1/2007 | Liggitt | B60R 25/24 340/539.32 |
| 2010/0057308 A1* | 3/2010 | Hill | B60R 21/0132 701/51 |
| 2012/0109419 A1 | 5/2012 | Mercado | |
| 2013/0264382 A1* | 10/2013 | Taylor | G06Q 10/087 235/375 |
| 2015/0210199 A1* | 7/2015 | Payne | G06Q 10/08 701/1 |
| 2015/0274069 A1* | 10/2015 | Cuddihy | G01J 5/00 315/77 |
| 2016/0084550 A1* | 3/2016 | Fall | G01K 1/024 62/126 |
| 2016/0314667 A1 | 10/2016 | Bang-Olsen | |
| 2017/0166056 A1* | 6/2017 | Buttolo | B60K 37/06 |

* cited by examiner

*Primary Examiner* — Khoi H Tran
*Assistant Examiner* — Rodney P King
(74) *Attorney, Agent, or Firm* — Frank A. MacKenzie; Bejin Bieneman PLC (57) ABSTRACT

An object is identified within a specified distance from a vehicle. The object is assigned a position in the vehicle and the object is detected in the position. Upon detecting the object in the position, a vehicle component is actuated.

17 Claims, 4 Drawing Sheets

OBJECT DETECTION

BACKGROUND

Vehicles can transport users and cargo to destinations. Upon arriving at the vehicle, a user may possess an object, such as luggage, that needs to be stored in the vehicle during transport. In a driverless or autonomous vehicle, there may be no way to communicate to the user an available position in the vehicle to store the object or to determine if an object has been stored or retrieved from its assigned location. Thus, a current problem in autonomous vehicles is a lack of infrastructure for detecting objects and managing positions of objects in the vehicle.

DETAILED DESCRIPTION

A system includes a computer programmed to identify an object within a specified distance of, and external to, a vehicle via a wireless protocol, assign the identified object to a position in the vehicle, detect that the object is in the position, and upon detecting the object in the position, actuate a vehicle component.

The computer can be further programmed to identify the object according to one or more of an identifier transmitted via the wireless protocol and an image provided by a vehicle image sensor.

The computer can be further programmed to assign the identified object to the location in the vehicle by comparing a characteristic of the object with a characteristic of the location.

The position can be a storage bin. The storage bin can include an enclosed space formed of solid walls. One or more of the walls can include a conductive layer. The computer can be further programmed to receive, in a transceiver in the storage bin, a transmission from a transmitter associated with the object. The computer can be further programmed to receive, from the transceiver in the storage bin, a confirmation of the transmission from the object transmitter.

The vehicle component is one of a transmitter, a powertrain, a brake, and a steering.

The wireless protocol is Bluetooth® Low Energy (BLE).

A method includes identifying an object within a specified distance or, and external to, a vehicle via a wireless protocol, assigning the identified object to a position in the vehicle, detecting that the object is in the position, and upon detecting the object in in the position, actuating a vehicle component.

The method can further include identifying the object according to one or more of an identifier transmitted via the wireless protocol and an image provided by a vehicle image sensor. Assigning the identified object to the position in the vehicle includes comparing a characteristic of the object with a characteristic of the position.

The position can be a storage bin. The storage bin can include an enclosed space formed of solid walls. One or more of the walls can include a conductive layer. The method can further include receiving, in a transceiver in the storage bin, a transmission from a transmitter associated with the object. The method can further include receiving, from the transceiver in the storage bin, a confirmation of the transmission from the object transmitter.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Figure 1:
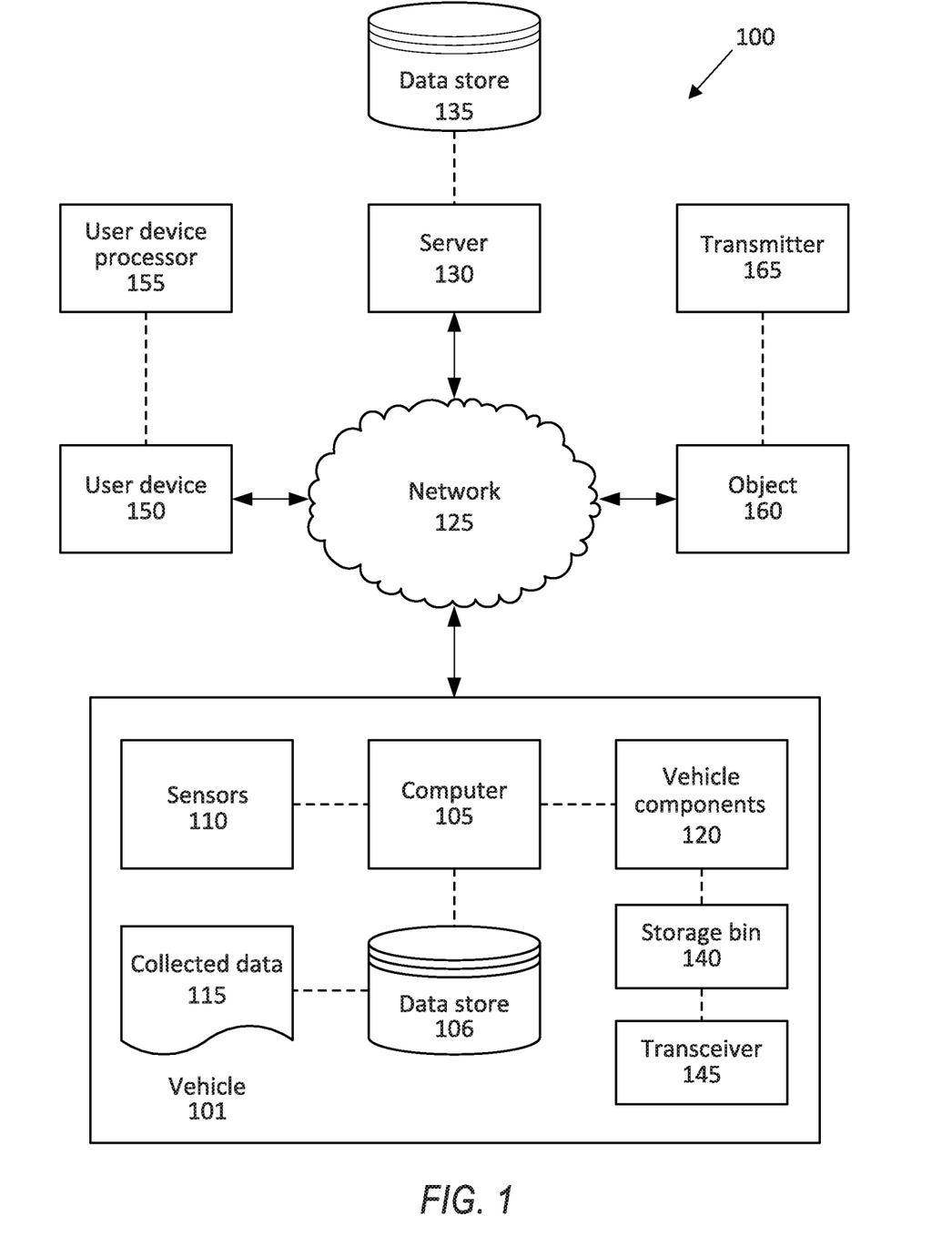
FIG. 1 is a block diagram of an example system for managing objects in and near a vehicle.

FIG. 1 illustrates an example system 100, including a computer 105 programmed to identify an object within a specified distance of, and external to, a vehicle 101 and assign the object a position in the vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle velocity, a vehicle trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a storage bin, a cargo compartment, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 includes a plurality of storage positions, exemplified in the present description by storage bins 140. The storage bins 140 may be disposed in the vehicle 101 cabin and supported by vehicle components, e.g., a floor, a seat, a roof, etc. The storage bins 140 can house objects in the vehicle 101 during transit. The computer 105 can actuate a door 142 or hatch of the storage bins 140 from a closed state to an opened state to allow ingress and egress of the object. For example, upon detecting an approaching object, the computer 105 can actuate the door 142 of the storage bin 140 to the opened state to allow the user to store the object in the storage bin 140. Prior to moving the vehicle 101 to the next destination, the computer 105 can actuate the door 142 of the storage bin 140 to the closed state after confirming the object is in the storage bin 140, as set forth below.

A storage bin 140 may include a transceiver 145. The transceiver 145 is in communication with the computer 105 via the vehicle network. The transceiver 145 can receive a message that the object 160 can transmit, e.g., the transmitter 165 can transmit the message, as described further below. Upon detecting the message from the object, the transceiver 145 can send a message to the computer 105 to confirm the object is in the storage bin 140. The transceiver 145 is implemented via antennas, circuits, chips, or other electronic components that can facilitate wireless communication. The transceiver 145 may be programmed to communicate in accordance with any number of wired or wireless communication protocols. For instance, the transceiver 145 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc.

The system 100 may include a user device 150. As used herein, a "user device" is a portable, computing device that includes a memory, a processor, a display, and one or more input mechanisms, such as a touchscreen, buttons, etc., as well as hardware and software for wireless communications such as described herein. Accordingly, the user device 150 may be any one of a variety of computing devices including a processor and a memory, e.g., a smartphone, a tablet, a personal digital assistant, etc. The user device 150 may use the network 125 to communicate with the vehicle computer 105. For example, the user device 150 can be communicatively coupled to each other and/or to the vehicle computer 105 with wireless technologies such as described above. The user device 150 includes a user device processor 155.

The system 100 may include an object 160. The object may be any object transportable in the vehicle 101 by the user. In other words, the user may transfer the object 160 into the vehicle 101 and transport the object 160 to a desired location in the vehicle 101. For example, the object 160 may be luggage, a parcel, a crate, or any other object 160 that the user may carry on to the vehicle 101.

A transmitter 165 may be affixed to the object 160, e.g., via Velcro®, glue, one or more fasteners such as rivets, staples, bolts, string or rope, etc., or some other fastening means. The transmitter 165 may, for example, be embedded in an object 160 surface such as a fabric cover and/or supported by the object 160 such that the transmitter 165 is transported, e.g., carried, with the object 160. The transmitter 165 can be in communication with the computer 105 as well as the transceiver 145 of the storage bin 140. For example, the transmitter 165 can be in communication with the computer 105 and/or the transceiver 145 via the network 125. The transmitter 165 can communicate directly with the computer 105, i.e., with a communication that is transmitted or received without an intervening device. For example, when the object 160 approaches the vehicle 101, the transmitter 165 can send a transmission directly to the computer 105 to allow the computer 105 to detect the object 160. Additionally, or alternatively, the transmitter 165 can communicate indirectly with the computer 105, i.e., with a communication that is transmitted or received via an intervening device, e.g., the transceiver 145 of the storage bin 140. For example, when the object 160 is placed in the storage bin 140, the transmitter 165 can send the transmission indirectly to the computer 105, e.g., the transmission can be relayed to the computer 105 through the transceiver 145, to confirm the object 160 is in the storage bin 140. The transmitter 165 may be a radio transmitter, a radar transmitter, an ultrasonic transmitter, and/or a sonar transmitter.

The object 160 transmitter 165 can include an antenna to send a transmission that can be received by, e.g., the computer 105 and/or the transceiver 145. The transmission can include a carrier message and an identifier unique to the object 160. The carrier message may include a strength indicator, such as a Received Signal Strength Indicator (RSSI). The transmission can include a radio wave transmission, an encoded digital message, a modulated analog message, etc. The transmitter 165 can include an electronic oscillator to generate the carrier message. The identifier can include information, e.g., a descriptor of the object 160, characteristics of the object 160, etc., that can identify the object 160. The transmitter 165 can include a modulator circuit to combine the identifier with the carrier message, using known modulation techniques, e.g., amplitude modulation, frequency modulation, frequency-shift keying, e.g., shifting between two frequencies to transmit digital data, etc. Upon detecting the transmission, the computer 105 can decode the transmission, using known decoding techniques, to identify the object 160, e.g., the computer can identify the identifier in the transmission to determine the descriptor and/or characteristic of the object 160.

Figure 2:
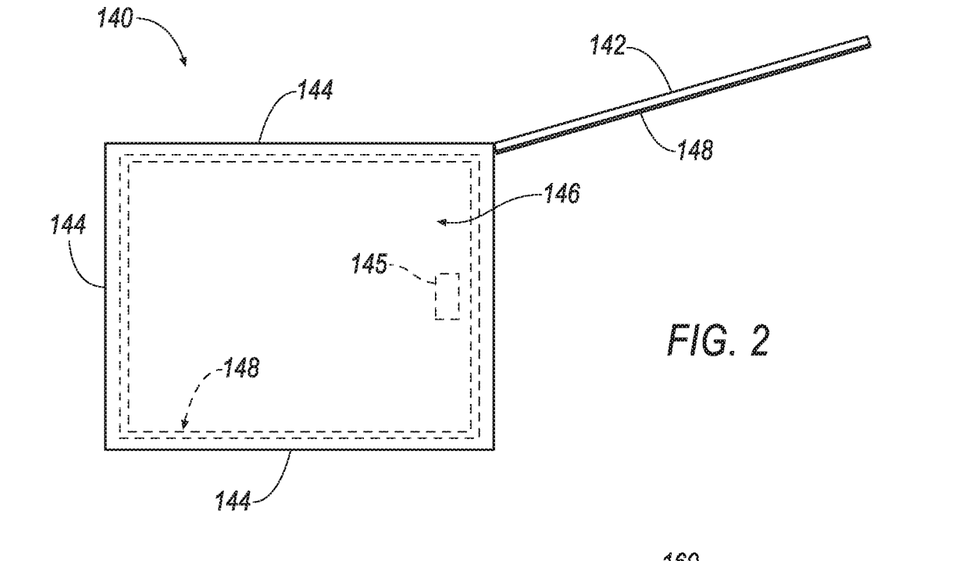
FIG. 2 is a side view of an example position in an example vehicle.

FIG. 2 illustrates an example storage position in the vehicle 101. A "storage position" is a space in the vehicle 101 in which an object 160 can be stored or stowed, e.g., for travel. The computer 105 can maintain a list of storage positions in the vehicle 101 according to a three-dimensional Cartesian or other coordinate system that can be mapped onto space within a vehicle body, e.g., passenger cabin, cargo compartment(s), etc. For example, the computer 105 can maintain a list of possible storage positions according to substantially unique identifiers for each position and/or descriptors (e.g., "trunk," "under front passenger seat," etc.), along with a set of coordinates specifying a vehicle space associated with each respective position, e.g., coordinate x, y, z, triplets specifying vertices for a rectangular solid used to specify the space that is the storage position. For example, the storage position may be a storage bin 140 disposed in the vehicle 101 cabin. Alternatively, the storage position may be in the vehicle cargo compartment, e.g., the trunk. The computer 105 can store a set of Cartesian coordinates indicating a space of the storage bin 140 and/or can store an identifier for the storage bin 140 that can likewise be associated with a transceiver 145 and/or sensors in the storage bin 140 so that the storage position can be monitored as described herein.

A storage position, such as a storage bin 140, includes an enclosed space 146 formed of solid walls 144, e.g., the object may be stored in the enclosed space 146. The walls 144 can extend around the enclosed space 146 and support the storage bin 140. The walls 144 may, for example, be a solid surface, e.g., the walls 144 can be metal or plastic, extending continuously around the enclosed space 146, e.g., each wall 144 may extend from one wall 144 to another wall 144.

One or more of the walls 144 may be moveable relative to the other walls 144. For example, the storage bin 140 may include a door 142 selectively moveable from the closed state to the opened state. The door 142 may be hingedly attached to one wall 144. The computer 105 can actuate the door 142 from the closed state to the opened state to allow ingress and egress of the object 160. For example, when the vehicle 101 detects an approaching object 160, the computer 105 can actuate the door 142 to the opened state to allow the user to store the object 160 in the storage bin 140. Prior to moving the vehicle 101 to the next destination, the computer 105 can actuate the door 142 to the closed state after confirming the object 160 is in the storage bin 140.

One or more of the walls 144 can include a conductive layer 148 extending across the wall 144. The conductive layer 148 can be configured to enhance a wireless message from the transmitter 165 associated with the object 160. For example, the conductive layer 148 can be metal, e.g., copper, aluminum, iron, etc., to degrade, e.g., block, deflect, interfere with, etc., wireless messages from outside sources, e.g., user devices 150 outside of the storage bin 140. As another example, the conductive layer 148 can be a conductive plastic, e.g., polyacetylene, polyphenylene vinylene, etc. When the conductive layer 148 degrades the wireless messages from outside sources, the wireless message from the transmitter 165 associated with the object 160 may be relatively stronger than wireless messages from the outside sources. (In this context, an "outside source" is an RF transmission source outside of the storage bin 140.) When the transceiver 145 receives the stronger message in the storage bin 140, the computer 105 can confirm the object 160 is disposed in the storage bin 140, e.g., the computer 105 can identify the message from the transmitter 165 associated with the object 160 according to the relative strength of the message from the transmitter 165.

The transceiver 145 can be disposed within the storage bin 140. For example, the transceiver 145 may be attached to one wall 144 of the storage bin 140. The transceiver 145 can identify the object 160 is stored in the storage bin 140. For example, the transceiver 145 can receive a message from the transmitter 165 of the object 160 when the object 160 is disposed in the storage bin 140. The transceiver 145 can send a message to the computer 105 to confirm the object 160 is disposed in the storage bin 140. When the computer 105 receives the confirmation message, the computer 105 can actuate the door 142 of the storage bin 140 to the closed state.

Figure 3:
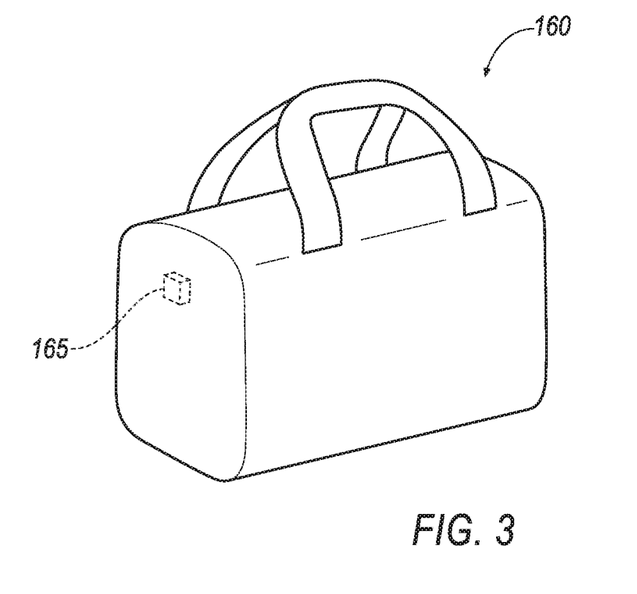
FIG. 3 is a perspective view of an example object.

FIG. 3 illustrates an example object 160. The object 160 can be luggage, e.g., a suitcase, a duffle bag, a backpack, a briefcase, etc., that the user can transport in the vehicle 101. The object 160 can include the transmitter 165, e.g., the transmitter 165 is affixed, e.g., via glue, VELCRO®, wire, thread, and/or a rivet, etc., to the object 160 prior to the user approaching the vehicle 101. Alternatively, the user can affix the transmitter 165 to the object 160 when the user arrives at the vehicle 101, e.g., the vehicle 101 can include transmitters 165 that the user can affix to the object 160. The transmitter 165 can send a message identifying the object 160 to the computer 105 and/or the transceiver 145. When the computer receives the message from the transmitter 165 as the object 160 approaches the vehicle 101, the computer can actuate the door 142 of a storage bin 140 to the opened state. When the object has been placed in a storage position, e.g., a storage bin 140, a transceiver 145 in the storage bin 140 can receive the message from the transmitter 165, and further the transceiver 145 can communicate with the computer 105 via the network 125 to actuate the door 142 of the storage bin 140 to the closed state.

Figure 4:
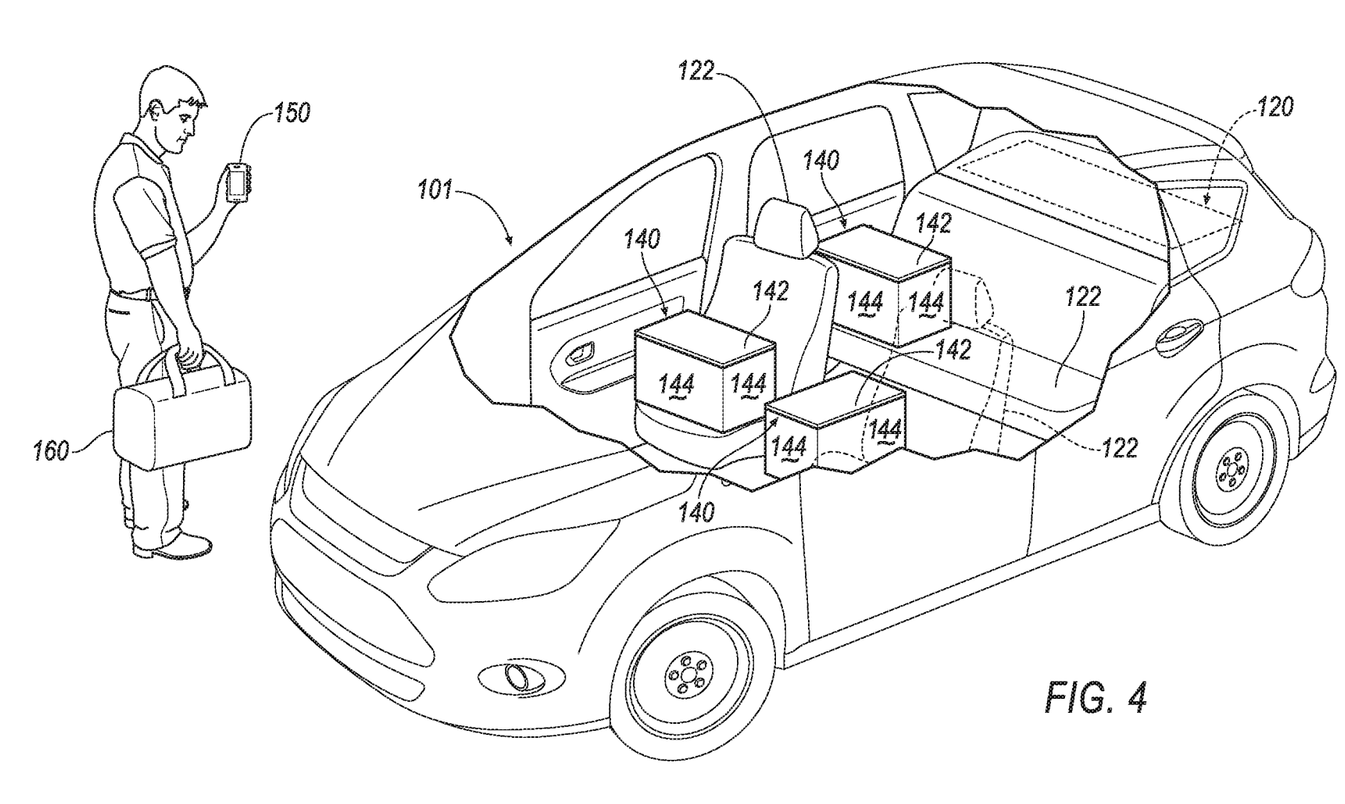
FIG. 4 is a view of an example object and an example vehicle.

FIG. 4 illustrates an example object and an example vehicle. The vehicle 101 includes a plurality of seats 122. The seats 122 support the users of the vehicle 101 cabin. The seats 122 can be arranged in the vehicle 101 cabin to accommodate users and objects 160, e.g., cargo, luggage, etc. The vehicle 101 can be an autonomous service vehicle that can transport users and objects 160 to respective destinations.

The vehicle 101 may include a plurality of storage positions, e.g., storage bins 140. The storage positions can be spaces in the vehicle 101 where objects 160 can be stored while the vehicle 101 is in transit. The positions can be arranged in the vehicle 101 to accommodate users and objects 160. For example, the storage positions can be one or more of the storage bins 140 and/or cargo compartment (s), e.g., the trunk, of the vehicle 101. Each storage position can be assigned to one of the seats 122. That is, each user in the vehicle 101 can use one of the storage positions for storing objects 160 while the vehicle 101 is in transit. Alternatively or additionally, each storage position can be associated with characteristics of the objects 160, as described herein. The computer 105 can determine the specific storage position, e.g., a specific storage bin 140, for each object 160 and detect objects 160 in the storage positions. Thus, when one of the users reaches the destination, the computer 105 can determine whether the user has left one or more objects 160 in the respective storage position.

The vehicle 101 can include a vehicle image sensor 110 for capturing an image of the object 160. The vehicle image sensor 110 may be supported by the vehicle 101 and may face away from the vehicle 101 to detect objects 160 external to the vehicle 101. The vehicle image sensor 110 may be a camera that provides an image from the visible light spectrum, whereby conventional image analysis techniques can be used to detect the object 160. The computer 105 can maintain a database of stored object images according to characteristics of the object 160, i.e., characteristics that can be identified according to image recognition techniques and used to determine a type of object 160. For example, the computer 105 can maintain lists of possible objects according to substantially unique identifiers for each object type, and/or descriptors for each object type, e.g., "suitcase," "duffle bag," "laptop," etc. As another example, the vehicle image sensor 110 may be a thermal imaging sensor, radar, lidar, etc.

The computer 105 can determine that the object 160 is approaching the vehicle 101 by receiving a message from the transmitter 165 via a wireless protocol within a specified distance from the vehicle 101. The specified distance is a distance value stored in a memory of the computer 105, and is determined as a distance from the vehicle 101, e.g., a radius from a center point or some other point within the vehicle 101, at which the object 160, when the object 160 is at or within the specified distance, is approaching the vehicle 101. The specified distance may be configurable based on a location of and/or environment surrounding the vehicle 101. For example, the specified distance can be smaller in high density areas, e.g., areas where multiple objects 160 may be relatively close to the vehicle 101, than in low density areas to ensure proper identification of the object 160. The vehicle 101 can include a plurality of sensors, e.g., BLE proximity sensors, that can detect the transmission from the transmitter 165 affixed to the object 160 when the object 160 is within the specified distance. For example, the computer 105 may be programmed to determine that the object 160 is within the specified distance based on received image data from the vehicle image sensor 110 with a field of view that extends to the specified distance. As another example, the computer 105 may be programmed to determine a signal strength indicator, such as a Received Signal Strength Indicator (RSSI), associated with the object 160 transmitter 165. Based on the signal strength indicator, the computer 105 may determine that the object 160 is within the specified distance, e.g. the signal strength indicator is above signal strength threshold. Additionally, or alternatively, the user can reserve the position in the vehicle 101 for the object 160. For example, the user device 150 can send a message via the wireless protocol to identify the object 160 to be stored in the storage position and to ensure a storage position is available for the object 160.

The wireless protocol may be any suitable wireless communication protocol. For example, the wireless protocol may be Bluetooth® Low Energy (BLE). Alternatively, the wireless protocol may be Bluetooth®, Wi-Fi, or any other suitable wireless communication.

The computer 105 can identify the object 160 approaching the vehicle upon detecting the transmission from the transmitter 165. For example, the transmission can include the identifier, e.g., a descriptor and/or characteristics of the object 160, that the computer 105 can detect, e.g., the computer 105 can decode the transmission, to identify the object 160. The computer 105 can maintain a list of identifiers according to wireless communication characteristics, e.g., frequency and amplitude, that can be associated with different types of objects 160. For example, the computer can maintain lists of possible objects according to substantially unique identifiers for each object 160 and/or descriptors, e.g., "suitcase," "duffle bag," "laptop," etc. After detecting the message from the transmitter 165, the computer 105 can, using known processing techniques, compare the identifier to the stored list to identify the object 160. As another example, the computer 105 can identify the object 160 by an image captured by the vehicle image sensor 110. After detecting the message from the transmitter 165 within the specified distance, the computer 105 can actuate the vehicle image sensor 110 to capture an image of the object 160. The computer 105 can, using known processing techniques, compare the image of the object 160 to a stored object image to identify the object 160. After identifying the object 160, the computer 105 can assign the object 160 to a storage bin 140.

The computer 105 can determine characteristics of the object 160. An object characteristic is any physical property of the object 160. For example, objects characteristics can include dimensions of the object 160, e.g., length, height, width, circumference, etc., as applicable. As another example, a characteristic may be a mass or weight of the object 160. Additionally, or alternatively, the characteristic may be material properties of the object 160. The object 160 may, for example, contain hazardous material, whereby it is desirable that a selected storage bin 140 be suited to store and transport hazardous material. The vehicle 101 can include a plurality of sensors, e.g., the vehicle image sensor 110, a weight sensor disposed in a bin 140, etc., that can detect characteristics of the object 160. Additionally, or alternatively, the user can identify the characteristics of the object 160 via the user device 150.

The computer 105 can compare the characteristics of the object 160 to stored characteristics, i.e., physical properties and/or capacities, of each storage bin 140 in the vehicle 101. The characteristics of the storage bin 140 may be dimensions, e.g., length, width, and height, and object 160 restrictions, e.g., whether the object contains hazardous material. The computer 105 can assign the object 160 to the storage bin 140 when the characteristic of the object 160 satisfies a constraint based on the characteristic of the storage bin 140, e.g. airline carry-on luggage requirements, hazardous material requirements, etc. When the object 160 satisfies the constraint, the computer 105 can assign the object 160 to an available storage bin 140, e.g., the storage bin 140 associated with the seat 122 of the user, and can actuate the door 142 of the storage bin 140 to the opened state. Alternatively, if the object 160 exceeds constraint, then the computer 105 can assign the object 160 to the cargo compartment of the vehicle 101 and can actuate the door 142, e.g., the decklid, of the cargo compartment to the opened state.

The computer 105 can actuate the vehicle 101 to proceed to a destination, e.g., actuate a navigation component to navigate the vehicle 101 to the destination and the propulsion component to drive the vehicle 101 to the destination. When the object 160 is stored in the storage bin 140, the transceiver 145 can receive the transmission from the transmitter 165 and send a confirmation to the computer 105 that the object 160 is in the storage bin 140. The computer 105 can actuate the door 142 of the storage bin 140 to the closed state when the computer 105 receives the confirmation from the transceiver 145. When the door 142 of the storage bin 140 is in the closed state, the computer 105 can actuate the vehicle component 120 to drive the vehicle 101 to the destination.

The computer 105 can detect a user leaving the vehicle 101 based on data from a user detection sensor 110, e.g., a weight sensor 110 installed in the seat 122. Alternatively or additionally, the user detection sensor 110 can be some other a sensor known for use to detect an occupant or user presence in a vehicle 101, e.g., a camera, etc., as is known. For example, if the user detection sensor 110 is a weight sensor, the computer 105 can compare baseline data indicating that the seat 122 is unoccupied to a threshold reading (e.g., a pressure reading) to collected pressure data 115 to determine if the seat 122 is occupied or unoccupied. Furthermore, when the computer 105 determines that the user is not in the seat 122 upon arriving at the destination and that the user was in the seat 122 at a time prior to arriving at the destination, the computer 105 can determine that the user has left the seat 122.

The computer 105 can associate the storage position assigned to the seat 122 to the user in the seat 122. Thus, upon detecting that the user has left the seat 122, the computer 105 can search for objects 160 left in the storage position. For example, if the computer 105 assigned the user a storage bin 140 upon detecting an object 160, the computer 105 can send a message to the user device 150 indicating the storage bin 140 and instructing the user to place his or her object 160 in the storage bin 140. When the user leaves the vehicle 101, e.g., determined based on a change of occupancy of the seat 122 from occupied to unoccupied, the transceiver 145 can send a message to the computer 105 upon receiving a message from an object 160 transmitter 165 left in the storage bin 140.

The computer 105 can detect a user departure from the vehicle 101 by detecting a location of the user device 150. The vehicle 101 can include a plurality of sensors 110, e.g., BLE proximity sensors, that can detect a location of the user device 150 in the vehicle 101. The computer 105 can communicate with the user device 150 to provide data about the location of the user device 150. When the sensors 110 detect that the location of the user device 150 is outside the vehicle 101 cabin, the computer 105 can determine that the user that possesses the user device 150 is outside the vehicle 101 cabin, i.e., that user has departed the vehicle 101.

When the vehicle 101 stops at the destination, the computer 105 can actuate the storage bin 140 to the opened state, and the transceiver 145 can receive a message from a transmitter 165, e.g., an object 160, left in the storage bin 140 assigned to the user departing at the destination. Upon receiving a message from the transmitter 165 assigned to the departing user, the transceiver 145 can send a message to the computer 105, and the computer 105, upon receiving the message from the transceiver 145, can send a message to the user device 150 to remind the user to retrieve his or her object 160. When the computer 105 identifies the object 160 in the storage bin 140 based on the message received at the transceiver 145, the computer 105 can actuate output on the user device 150 to so inform the user departing at the destination. For example, the computer 105 can send a message to the user device 150, actuate a haptic feedback device in the user device 150, flash a light in the user device 150, actuate a speaker in the user device 150 to produce an audio cue, etc. Alternatively, or additionally, the computer 105 can actuate a visual display on the vehicle 101, e.g., a vehicle travel bar, e.g., an electronic sign affixed to the vehicle 101 configurable to display information, e.g., a route, a departure and/or arrival time, etc., to users of the vehicle 101. The computer 105 can wait for a predetermined period of time (stored in the data store and/or the server) and actuate the user output after the period of time elapses at the destination, e.g., to give the user time to retrieve and depart with the object 160. Additionally, the computer 105 can actuate the door 142 of the storage bin 140 to the opened state. When the object 160 is removed from the storage bin 140, the conductive layer 148 can degrade the message sent by the transmitter 165 to the transceiver 145, e.g., a message including the identifier of the object 160, to the transceiver 145, i.e., the transmitter 165 is an outside source. In this situation, the transceiver 145 can send a message to the computer 105 to confirm that the object 160 is removed from the storage bin 140. Upon confirming the object is removed from the storage bin 140, the computer 105 can actuate the storage bin 140 to the closed state and can drive the vehicle to the next destination.

Figure 5:
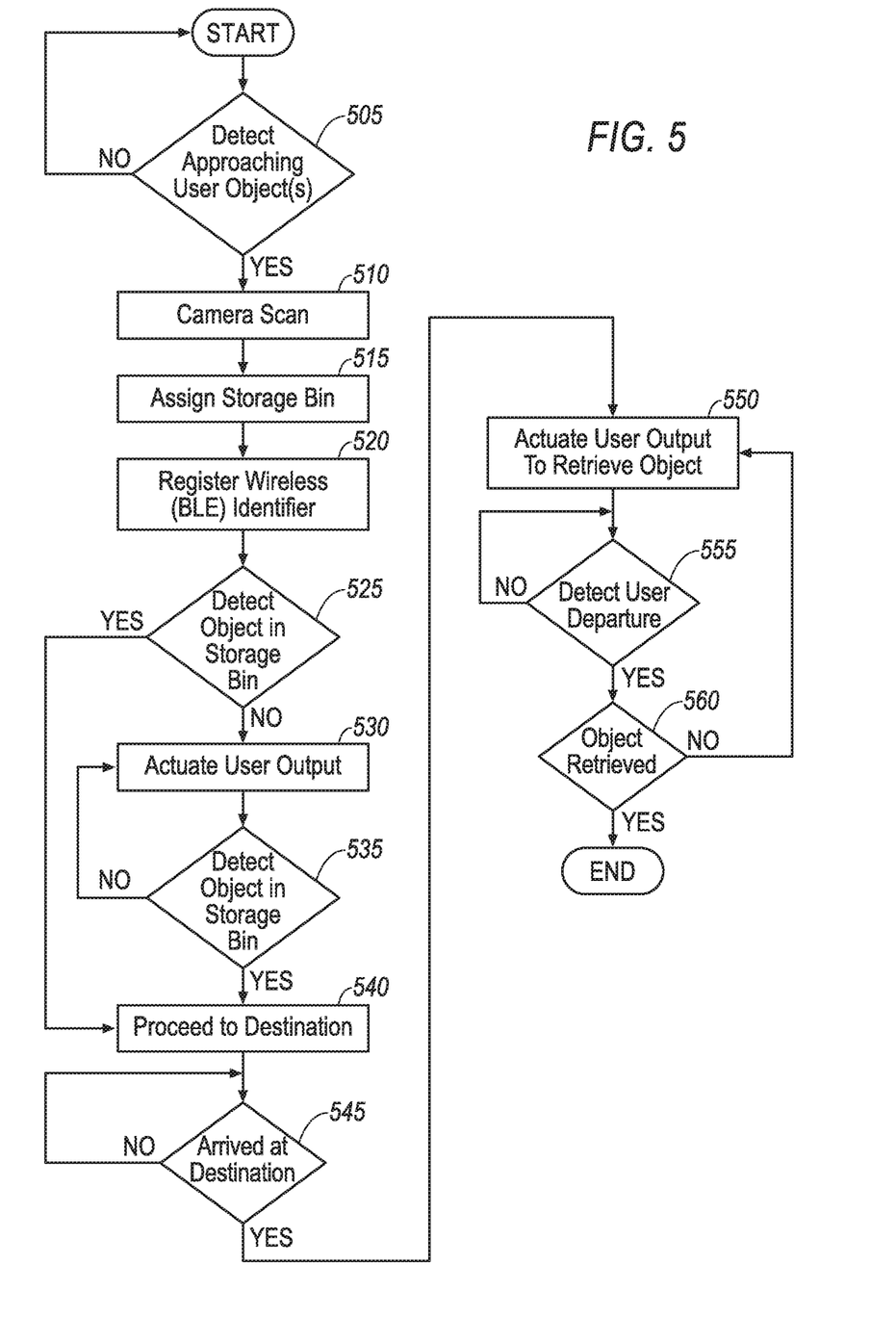
FIG. 5 is an example process for detecting the object within a specified distance of a vehicle and assigning the object to the position in the vehicle.

FIG. 5 illustrates an example process for detecting the object 160 within a specified distance of the vehicle 101 and assigning the object 160 to a storage position in the vehicle 101. The process 500 begins in a block 505, in which the computer 105 detects an object 160 approaching the vehicle 101. As described above, the computer 105 can detect when the object 160 is within a specified distance of the vehicle 101, e.g., detecting a signal strength indicator, e.g., RSSI, from the transmitter 165 above a signal strength threshold, receiving a message from a user device 150, etc. If the computer 105 detects the object 160 within the specified distance, the process 500 continues in a block 510. Otherwise, the process remains in the block 505.

In the block 510, the computer 105 actuates the vehicle image sensor 120 to detect an image of the object 160 within the specified distance. As set forth above, the computer 105 can compare the captured image of the object 160 to identify characteristics of the object 160, e.g., dimensions, weight, etc. The vehicle image sensor 120 can have a field of view extending to the specified distance to capture images of the object 160 within the specified distance.

Next, in a block 515, the computer 105 assigns the object 160 to a storage position in the vehicle 101, e.g., a storage bin 140 associated with a seat 122, a cargo compartment, i.e., the trunk, etc. As set forth above, the computer 105 can determine the characteristics of the object 160 and compare the characteristics of the object 160 to the characteristics of a storage bin 140. Based on the characteristics of the object 160, the computer 105 can assign the object 160 to a storage bin 140 capable for storing the object 160 during transport. The computer 105 can actuate the assigned storage bin 140 to the open position to allow stowage of the object 160.

Next, in a block 520, the computer 105 registers the wireless identifier of the object 160. As described above, the computer 105 can maintain a list of identifiers unique to an object 160. The computer 105 can store the identifier of the object 160 to compare the identifier to a message received from the transceiver 145, as set forth below.

Next, in a block 525, the transceiver 145 can detect the object 160 in the assigned storage bin 140. As described above, the storage bin 140 typically includes a conductive layer 148 that can degrade messages from outside sources, e.g., a user device 150. When the object 160 is stored in the assigned storage bin 140, the transceiver 145 can detect the message from the transmitter 165, e.g., the message can include the identifier of the object 160, because the message is stronger relative to messages from the outside sources. The transceiver 145 can send a confirmation message, e.g., including the identifier of the object 160, to the computer 105 that the object 160 is in the assigned storage bin 140. The computer 105 can compare the received identifier with the identifier registered in the block 520 above to determine if the object 160 is detected in the assigned storage bin 140. If the object 160 is detected in the assigned storage bin 140, the process 500 continues to a block 540. Otherwise, the process 500 continues to block 530.

In the block 530, the computer 105 actuates output to the user device 150. For example, the computer 105 can send a message over the network 125 to the user device 150. Alternatively or additionally, the computer 105 can actuate a haptic device and/or a light and/or an audio cue on the user device 150. As described above, the message can indicate that the user has left the object 160 in the storage bin 140.

Next, in a block 535, the computer 105 detects whether the object 160 is in the storage bin 140. For example, the transceiver 145 can detect a transmission from the transmitter 165 if the object is in the storage bin 140, as described above. If the object 160 remains in the storage bin 140, the process 500 returns to block 530. Otherwise, the process 500 continues to block 540.

In the block 540, the vehicle 101 proceeds to a destination. For example, the computer 105 can actuate vehicle 101 components, e.g., a propulsion component and a navigation component, to drive and navigate the vehicle 101 to the destination.

In a block 545, the computer 105 can determine that the vehicle 101 arrived at the destination. The computer 105 can receive data 115, for example, from a navigation component, to determine that the vehicle 101 arrived at the destination. If the vehicle 101 arrived at the destination, the process 500 can continue to a block 550. Otherwise, the process remains at the block 545.

In the block 550, the computer 105 actuates output to the user device 150. For example, the computer 105 can send a message over the network 125 to the user device 150. Alternatively or additionally, the computer 105 can actuate a haptic device and/or a light and/or an audio cue on the user device 150. As described above, the message can provide a reminder to the user to retrieve object 160 from the storage bin 140.

Next, in a block 555, the computer 105 can detect a user departure from the vehicle 101. As described above, the computer 105 can detect the user leaving the vehicle 101 by, e.g., collecting data 115 from a user detection sensor 110 in a vehicle seat, arriving a predetermined destination for the user, collecting visual data 115 about the user, detecting a user device 150 outside of the vehicle 101 cabin, shutting off the vehicle 101, etc. If the computer 105 detects a user departure, the process 500 continues in a block 560. Otherwise, the process 500 remains in the block 555.

In the block 560, the computer 105 can determine that the object 160 was retrieved from the storage bin 140. As described above, when the object 160 is removed from the storage bin 140, the transceiver 145 can send a message to the computer 105. If the object 160 was removed from the storage bin 140, the computer 105 can actuate the storage bin 140 to the closed position and the process 500 ends. Otherwise, the process 500 returns to block 550 to remind the user to retrieve the object 160.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, JavaScript, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, comprising:
   identifying an object within a specified distance of, and external to, a vehicle via a wireless protocol;
   assigning the identified object to a storage bin, the storage bin being within the vehicle and including a door;
   then actuating the door of the storage bin to an opened state;
   detecting that the object is in the storage bin based on a transceiver in the storage bin receiving a transmission from a transmitter affixed to the object; and
   upon detecting the object in the storage bin, actuating a vehicle component.

2. The method of claim 1, further comprising identifying the object according to one or more of an identifier transmitted via the wireless protocol and an image provided by a vehicle image sensor.

3. The method of claim 2, wherein assigning the identified object to the storage bin in the vehicle includes comparing a characteristic of the object with a characteristic of the storage bin.

4. The method of claim 1, wherein the storage bin includes an enclosed space formed of solid walls.

5. The method of claim 4, wherein one or more of the walls includes a conductive layer configured to enhance the transmission from the transmitter.

6. The method of claim 1, further comprising receiving, from the transceiver in the position bin, a confirmation of the transmission from the object transmitter.

7. The method of claim 1, wherein the vehicle component is one of a powertrain, a brake, and a steering.

8. The method of claim 1, wherein the wireless protocol is Bluetooth® Low Energy (BLE).

9. The system of claim 1, wherein the vehicle component is one of a powertrain, a brake, and a steering.

10. A system, comprising a computer programmed to:
    identify an object within a specified distance, and external to, a vehicle via a wireless protocol;
    assign the identified object to a storage bin, the storage bin being within the vehicle and including a door;
    then actuate the door of the storage bin to an opened state;
    detect that the object is in the storage bin based on a transceiver in the storage bin receiving a transmission from a transmitter affixed to the object; and
    upon detecting the object in the storage bin, actuate a vehicle component.

11. The system of claim 10, wherein the computer is further programmed to identify the object according to one or more of an identifier transmitted via the wireless protocol and an image provided by a vehicle image sensor.

12. The system of claim 11, wherein the computer is further programmed to assign the identified object to the storage bin in the vehicle by comparing a characteristic of the object with a characteristic of the storage bin.

13. The system of claim 10, wherein the storage bin includes an enclosed space formed of solid walls.

14. The system of claim 13, wherein one or more of the walls includes a conductive layer configured to enhance the transmission from the transmitter.

15. The system of claim 10, wherein the computer is further programmed to receive, from the transceiver in the storage bin, a confirmation of the transmission from the object transmitter.

16. The system of claim 10, wherein the wireless protocol is Bluetooth® Low Energy (BLE).

17. A system, comprising a computer programmed to:
    identify an object within a specified distance, and external to, a vehicle via a wireless protocol;
    assign the identified object to a storage position, the storage position being within the vehicle and being accessible through a door;
    then actuate the door of the storage position to an opened state;
    detect that the object is in the storage position; and
    upon detecting the object in the storage position, actuate a vehicle component, wherein the vehicle component is one of a powertrain, a brake, and a steering.

* * * * *

UNITED STATES PATENT AND TRADEMARK OFFICE
CERTIFICATE OF CORRECTION

PATENT NO. : 11,200,530 B2  
APPLICATION NO. : 15/681847  
DATED : December 14, 2021  
INVENTOR(S) : Stuart C. Salter et al.

It is certified that error appears in the above-identified patent and that said Letters Patent is hereby corrected as shown below:

In the Claims

Claim 6, Column 13, Line 48: delete "position" and insert --storage--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*